(12) United States Patent
Glöckler et al.

(10) Patent No.: US 6,400,963 B1
(45) Date of Patent: Jun. 4, 2002

(54) HARMONIC SUPPRESSION IN DUAL BAND MOBILE PHONES

(75) Inventors: Roman Glöckler, Lauf; Alexander Herold, Nuremberg, both of (DE); Paul Johansson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/316,134

(22) Filed: May 21, 1999

(30) Foreign Application Priority Data

May 22, 1998 (DE) .......................................... 198 23 049

(51) Int. Cl.[7] ................................................. H04B 1/38
(52) U.S. Cl. ........................ 455/553; 455/82; 455/83; 455/552; 333/104
(58) Field of Search .............................. 455/78, 80, 82, 455/83, 552, 553, 562; 333/101, 103, 104, 105

(56) References Cited

U.S. PATENT DOCUMENTS 5,212,813 A    5/1993  Renaud 5,930,373 A * 7/1999 Shashoua et al. ............. 455/82
6,317,608 B1 * 11/2001 Glocker ....................... 455/553

FOREIGN PATENT DOCUMENTS

| DE | 197 04 151 C 1 | 8/1998 |
| EP | 0 682 458 A2 | 11/1995 |
| EP | 0 872 953 A1 | 9/1997 |
| EP | 0 798 880 A2 | 10/1997 |
| EP | 0 823 751 A2 | 2/1998 |
| WO | WO 93/14573 | 7/1993 |

* cited by examiner

Primary Examiner—Nay Maung
(74) Attorney, Agent, or Firm—Burns, Doane, Swecker & Mathis, L.L.P.

(57) ABSTRACT

To effectively suppress harmonics in a dual band mobile phone with a power amplifier (10) outputting transmitting signals for different frequency bands (GSM; PCS, DCS) via a single output as described a power amplifier output circuit in which harmonics are filtered through impedance transformation of a turn-off impedance of a transmitter/receiver change over unit (36, 38). Hereby the desired filtering of harmonics may be achieved without almost no additional expenditure.

32 Claims, 8 Drawing Sheets

Fig. 1

EQUIVALENT CIRCUIT DIAGRAM,　　　　EQUIVALENT CIRCUIT DIAGRAM,
SWITCH OPENED　　　　　　　　　　　SWITCH CLOSED

HARMONIC SUPPRESSION IN DUAL BAND MOBILE PHONES

FIELD OF INVENTION

The present invention relates to harmonic suppression in dual band mobile phones

BACKGROUND OF INVENTION

Figure 10:
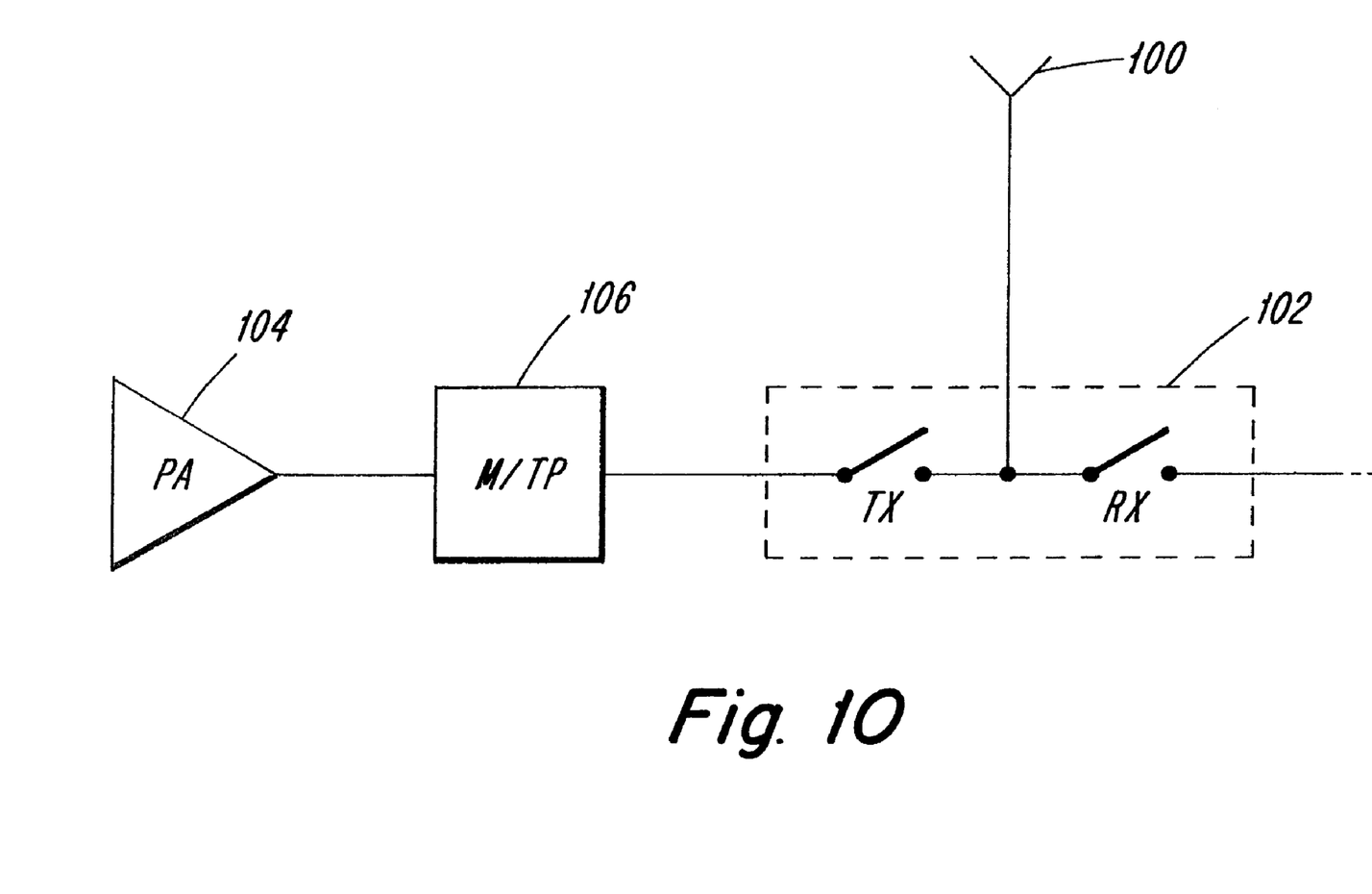
FIG. 10 shows a schematic diagram of a power amplifier output circuit for a single band mobile phone.

Currently mobile Phones are predominantly operated with only a single operating frequency. FIG. 10 shows one realization of the transmitting/receiving operation in a mobile phone being operated with a transmitting frequency, e.g., of approximately 900 MHz for GSM, approximately 1800 MHz for DCS or approximately 1900 MHz for PCS. An antenna 100 is provided to transmit or receive signals and is connected to a transmitter/receiver change over unit or in other words transmitter/receiver switch 102. A transmitter/receiver change over unit 102 comprises a transmitter switch TX and a receiver switch RX. In the receiving mode the receiver switch TX is opened and the receiver switch RX is closed. To the contrary, in the transmitting mode the transmitter switch TX is closed and the receiver switch RX is opened.

As shown in FIG. 10, in the transmitting mode the transmitting signal is outputted from a power amplifier 102 which—due to its operation near saturation—exhibits a non-linear behaviour such that besides the desired transmitting signal it also outputs harmonics of the transmitting signals. To meet predefined specifications, e.g., the ETSI-GSM-Standard, after the amplification through the power amplifier 104 there is carried out the matching of the output impedance of the power amplifier 104 in a further circuit unit 106 onto a line impedance of typically 50 Ω and in addition a low pass filtering of harmonics.

However, the circuit design shown in FIG. 10 with the increase of the digital mobile telephony is more and more unable to meet the requirements, in particular in rural areas, as an ever increasing number of subscriber faces only a limited number of transmitting frequencies and related transmission channels. Although an increased transmitting frequency, e.g., approximately 1800 MHz for DCS or approximately 1900 MHz for PCS compared to approximately 900 MHz for GSM allows for an increase in the number of transmission channels due to the increased total transmission bandwidth, this is only possible at the expense of a reduced transmission range at the base stations. As a result the number of base stations necessary to completely cover the prespecified area increases. From a practical viewpoint this results in investment costs which are beyond realistic limits.

Figure 11:
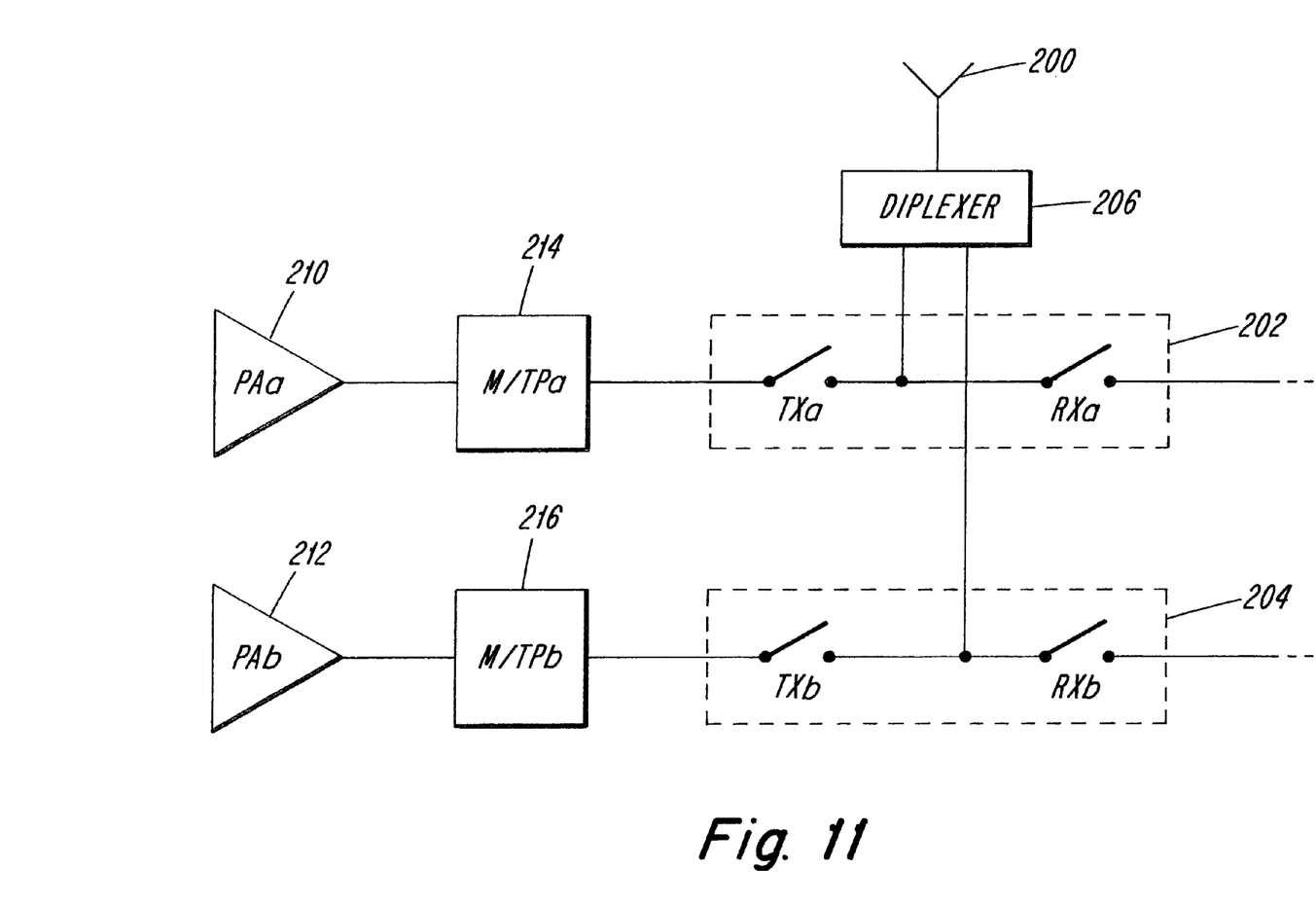
FIG. 11 shows a schematic diagram of a power amplifier output circuit for a dual band mobile phone with two power amplifiers.

To the contrary, a combination of technical advantages of the different approaches outlined above seems to be promising, in particular through the provision of cellular dual band networks and dual band mobile phones adapted thereto, i.e. through a combination of the GSM-frequency band with the DCS-and/or PCS-frequency band. FIG. 11 shows a possible circuit design adapted to the related transmission/receiving operation in a dual band mobile phone which is directly based on the approach shown in FIG. 10.

Here, an antenna 200 is connected to two transmitter/receiver change over units 202 and 204. The transmitter/receiver change over unit 202 comprises a transmitter switch TXa and a receiver switch RXa for a carrier frequency lying in the first frequency band. Further, the transmitter/receiver change over unit 204 comprises a transmitter switch TXb and a receiver switch RXb for a carrier frequency lying in a second frequency band. The switches TXa, RXa, TXb and RXb are operated according to the chosen operating frequency, respectively, as explained with reference to FIG. 10. Further, there is provided a diplexer 206 to join the transmission paths to the antenna. Further, there are provided two power amplifiers 210 and 212 as well as related circuit units 214 and 216 adapted to carry the impedance matching and low pass filtering. Alternatively, the two power amplifiers 210 and 212 for the two transmitting frequencies may be equivalently substituted through a single power amplifier with a plurality of output terminals.

The advantage of this direct generalization of the single band transmitter/receiver output circuit shown in FIG. 10 is that the transmission branches for both frequency bands are fully decoupled. Although the power amplifier is operated near saturation such that harmonics of both transmitting signals are generated these may be damped through appropriate dimensioning of the low pass filters TPa and TPb. Nevertheless, these advantages require additional circuit complexity. The additional circuit units not only increase the fabrication costs significantly but also the space requirements for this dual band transmitting/receiving circuit constitute an argument against its realization.

One approach to reduce the fabrication costs and the space requirements is the use of power amplifiers which output transmitting signals in a plurality of frequency bands via a single output terminal or equivalently of power amplifiers having different operation modes. For a combination of, e.g., GSM with a transmitting frequency of approximately 900 MHz and DCS with a transmitting frequency of approximately 1800 MHz the respective output power amounts to approximately 3 W and 1.5 W.

However, as explained with reference to FIGS. 10 and 11 the operation of the power amplifier is near saturation and thus in the first operation mode harmonics are generated at approximately 1800 MHz, approximately 2700 MHz, . . . and further in the second operation mode harmonics are generated at approximately 3600 MHz, etc. Here, regularly harmonics of first and second order are the dominating harmonics.

The result for the operation mode in the first transmitting frequency of, e.g., 900 MHz is that the first harmonic of the transmitting signal at 1800 MHz is not suppressed in the low pass filter TPb in the second transmission branch. Further, also with an opened transmitting switch TXb in the second transmission branch a full decoupling to the antenna is not achieved and therefore, not only the actual transmitting signal is radiated by the antenna but also the first harmonic thereof via the deactivated transmission branch for the second higher transmitting frequency. This occurs to an extent exceeding the limits set by predefined standards. Generally, this problem occurs for power amplifier outputting transmitting signals in a plurality of frequency bands in case the harmonic of the First, lower transmitting frequency is lower than the second, higher transmitting frequency or is identical thereto.

Therefore, the object of the present invention is to effectively suppress harmonics in a dual band mobile phone with a power amplifier outputting transmitting signals in different frequency bands via one output terminal.

According to the invention this object is achieved through a power amplifier output circuit for a dual band mobile radio unit, comprising a first transmitter/receiver change over means to transmit/receive a first transmitting/receiving signal in a first frequency band via an antenna of the mobile radio unit, a second transmitter/receiver change over means to transmit/receive a second transmitting/receiving signal in a second frequency band above the first frequency band via the antenna of the mobile radio unit, wherein a change over means selectively connects a power amplifier to amplify the transmitting signals with the first and second transmitter/receiver change over means, respectively, and an impedance transformation means is provided to transform a turn off impedance of the second transmitter/receiver change over means during the transmission of the first transmitting signal into a band stop characteristic tuned to harmonics of the center frequency f1 of the first frequency band.

According to the present invention the switchable band stop comprises three parts: the change over unit to selectively connect the power amplifier to the transmission branch for the second frequency band, the second transmitter/receiver change over unit and finally an impedance transformation means connected therebetween, respectively. All three components constitute a switchable band stop filter. The two change over units in addition provide essential necessary further functionalities. Only the impedance transformation means is provided exclusively for the implementation of the band stop behaviour.

During the amplification of the transmitting signal in the first frequency band the change over means in the second transmission branch constitutes an open circuit. In addition, the impedance transformation means transforms a turn off impedance of the second transmitter/receiver change over means into a short circuit. This leads to an impedance transmission step in the second transmission branch which enables—from a practical viewpoint—a nearly full reflection of the harmonics to be suppressed.

Overall the concept of a multifunctionality for the circuit units available anyhow in the power amplifier output circuit in interaction with an impedance transformation leads to an overlapping or in other words interleaved provision of different functional sections in the power amplifier output circuit. This enables the desired filtering of harmonics with essentially no additional expenditure.

According to a preferred embodiment of the invention the impedance transformation means is a quarter line or equivalently $\lambda/4$ line being tuned to the double center frequency of the first frequency band.

Since a $\lambda/4$ line may be easily fabricated in the form of a microstrip line or a strip line on a circuit substrate existing and approved circuit designs must only be slightly modified.

According to a further preferred embodiment of the present invention the change over means comprises a diode of the PIN type in each transmission branch, respectively. Further, there is provided an additional diode of the PIN-type as transmitter switch in the second transmitter/receiver change over means.

Thus, the diodes of the PIN type are provided in a series configuration in the second transmission branch during transmission in the second frequency band. Due to the series configuration a biasing of these diodes is necessary only during transmission via the second transmission branch. This may be achieved very easily since the same biasing current is flowing through all diodes of the PIN type and therefore, this biasing current may be controlled using only a single switching transistor. Further, only a single power supply is necessary to provide this biasing current which according to the present invention may also be used as drain power supply of the power amplifier.

Another reason speaking in favour of the series configurations of the diodes of the PIN type is that an inductivity is necessary to decouple the high frequent components of the transmission signals and the power supply for the biasing current. This inductivity is an open circuit for the high frequency components of the transmission signals and a short circuit for the biasing current. Since the inductivity or circuit component may only be fabricated at high costs the integrated supply of the diodes of the PIN type via only a single inductivity for decoupling purposes leads to decreased fabrication costs.

According to yet another preferred embodiment of the present invention there is provided a switchable notch filter in Shunt configuration downstream the transmitter switch of the second transmitter/receiver change over unit. The switchable notch filter comprise a capacitor connected to ground via a diode of the PIN type.

This enables a further improved damping of harmonics. The capacitor of the switchable notch filter together with the parasitic inductivity of the related diode of the PIN type in the activated state constitutes a series resonance circuit to filter harmonics during transmission of the first transmitting signal. Therefore, to achieve a further improved filtering behaviour only in this operation mode the notch filter must be switched or, equivalently, the diode of PIN type must be applied with current.

According to yet another preferred embodiment of the present invention there is provided an impedance matching circuit at the output of the power amplifier. Further, there are provided additional impedance matching circuits downstream the diodes of the PIN type in the change over means to achieve a related further impedance matching in the different transmission branches This stepwise approach to the impedance matching allows for a simultaneous matching of the output impedance of the power amplifier onto the load impedances specified for the different frequency bands and transmitting powers.

Figure 1:
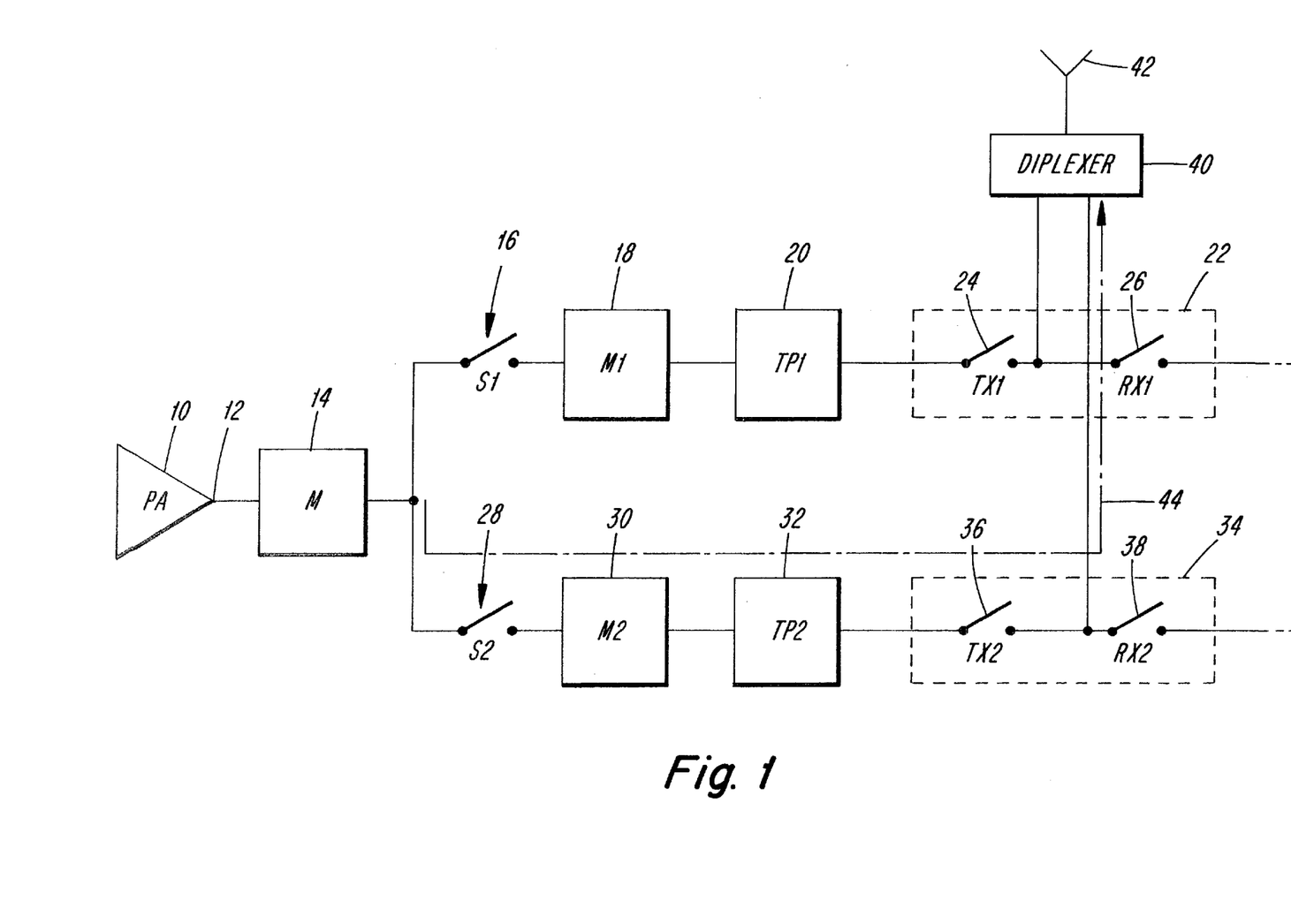
FIG. 1 shows a basic structure of a power amplifier output circuit for a dual band mobile phone wherein the power amplifier outputs transmitting signals in different frequency bands via one output terminal.

In the following detailed embodiments of the invention will be described with reference to the enclosed drawing in which:

FIG. 1 shows the basic structure of a power amplifier output circuit for a dual band mobile phone according to the present invention.

As shown in FIG. 1, a power amplifier 10 is connected at its output terminal 12 to a first impedance matching circuit 14. At the output of the first impedance matching circuit 14 there is provided a first switch 16 to connect the first impedance matching circuit 14 to a first transmission branch. The first transmission branch comprises a series configuration with a second impedance matching circuit 18, a first low pass filter 20 and a first transmitter/receiver change over unit 22. The first series configuration is operated in a first frequency band. The switch between the transmitting/receiving operation the first transmitter/receiver change over unit 22 comprises a first transmitter switch 24 and a first receiver switch 26.

As shown in FIG. 1 to the output of the first impedance matching circuit 14 there is also connected a second switch 28 that connects the first impedance matching circuit 14 to a second transmission branch. The second transmission branch comprises a series configuration with a third impedance matching circuit 30, a second low pass filter 32 and a second transmitter/receiver change over unit 34. This second series configuration is operated in a second frequency band. The switch between the transmitting/receiving operation, the second transmitter/receiver change over unit 34 comprises a second transmitter switch 36 and a second receiver switch 38

The center tap between the first transmitter switch 24 and the first receiver switch 26 and also the center tap between the second transmitter switch 36 and the second receiver switch 38 is connected to a diplexer 40 to connect the different transmitting/receiving paths to an antenna 42 without losses.

In a first operation mode where the power amplifier 10 outputs a transmitting signal in a first frequency band or, equivalently, with a first transmitting frequency f1 the first switch 16 is closed and the second switch 28 is opened. The first impedance matching circuit 14 and the second impedance matching circuit 18 achieve an optimum matching of the output impedance of the power amplifier 10 to the load impedance necessary for the first transmitting frequency and transmitting power. Since the power amplifier 10 is operated near saturation it outputs not only the actual transmitting signal with frequency f1 but also harmonics 2*f1, 3*f1, etc. These undesired harmonics are suppressed in the first low pass filter 20. Then, the filter transmitting signal is output to the antenna 42 via the closed first transmitter switch 24.

Further, in a second operation mode where the power amplifier 10 outputs a transmitting signal in a second frequency band or, equivalently, with a second transmitting frequency f2 the first switch 16 is opened and the second switch 28 is closed.

In this case, the first impedance matching circuit 14 and the third impedance matching circuit 30 achieve an optimum matching of the output impedance of the power amplifier 10 to the load impedance necessary for this second transmitting frequency and transmitting power. Undesired harmonics 2*f2, 3*f2, etc., which are again generated are suppressed by the second low pass filter before the output of the transmitting signal to the antenna 42 via the closed second transmitter switch 36.

In case of an ideal behaviour of the first switch 16 and the second switch 28 the output of the transmitting signals in two frequency bands through the power amplifier 10 with a single output would be fully realized.

Figure 2:
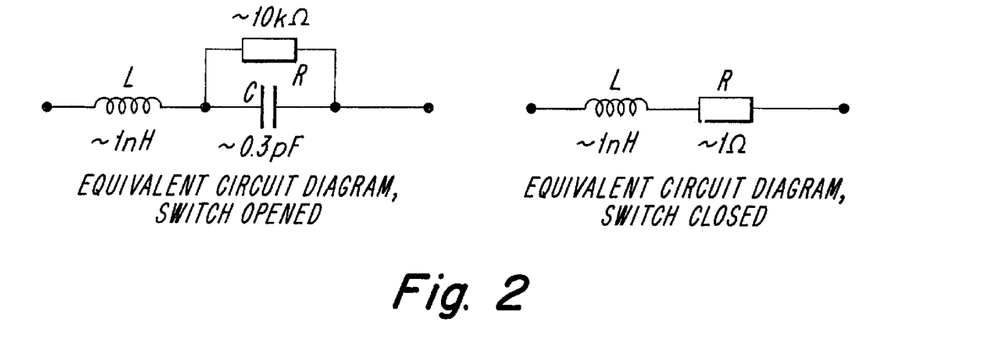
FIG. 2 shows an equivalent circuit diagram for the switches shown in FIG. 1 in the opened and closed state.

However, as is shown in FIG. 2 with reference to equivalent circuit diagrams for these switches, in the opened and closed state, e.g., for diodes of the PIN type used in practice, their switches exhibit a non-ideal behaviour. The damping in the opened state of the switches is limited and decreases with increasing frequency. For diodes of the PIN type a damping lies in the range of 25 dB for 900 MHz and 10 dB for 1800 MHz.

Figure 3A:
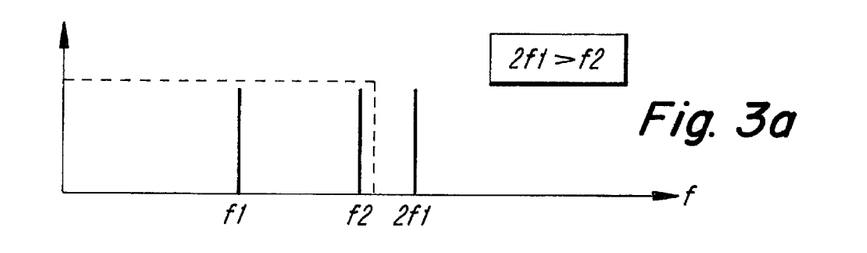
FIG. 3a, 3b, and 3c(henceforth referred to collectively as FIG. 3) show different transmitting frequencies and related harmonics in a dual band mobile phone.
Figure 3B:
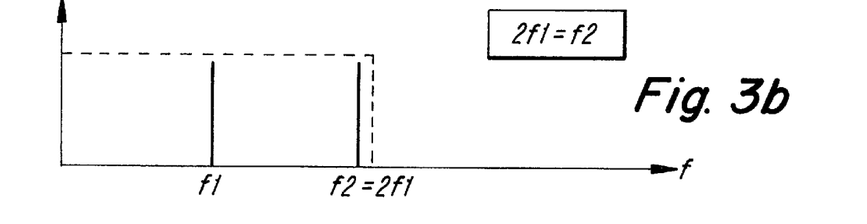
Figure 3C:
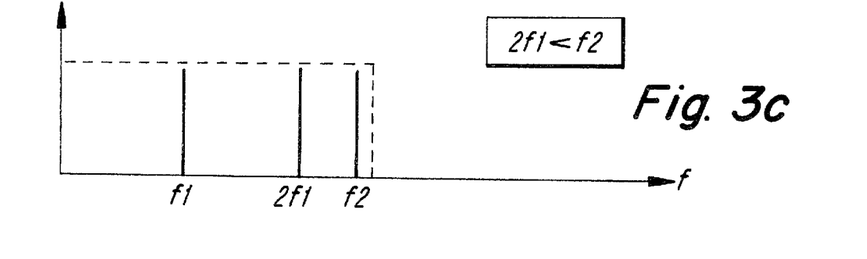

FIG. 3 shows the consequences of this non-ideal behaviour on the operation of the power amplifier output circuit shown in FIG. 1. In case the power amplifier 10 outputs a transmitting signal with the second frequency f2 related harmonics are fully suppressed through the first low pass filter 20. To the contrary, in the first operation mode where the power amplifier 10 outputs a transmitting signal with the frequency f1 there are to be considered different cases in particular with reference to the first harmonic thereof, i.e. the case 2*f1>f2, 2*f1=f2 and 2*f1 <f2, respectively.

In the first case during operation of the power amplifier 10 with the first frequency f1 the first and further harmonics 2*f1, 3*f1, . . . are suppressed through the second low pass filter 32 in the second transmission branch and thus not radiated by the antenna 42. Therefore, at most the transmitting signal itself reaches the antenna 42 via the side branch 44 shown in FIG. 1 with the second switch 28 opened and the second transmitter switch 36 opened.

However, this does not hold true for the second case with 2*f1=f2, e.g., for the dual band operation with GSM at approximately 900 MHz and DCS at approximately 1800 MHz. Here, the first harmonic of the first transmitting signal is not suppressed through the second low pass filter 32 in the second transmission branch and thus reaches the antenna 42 As shown in FIG. 3, the same holds true in the third case 2*f1<f2, e.g., during dual band operation with GSM at approximately 900 MHz and PCS at approximately 1900 MHz. In consequence, the limit values for the suppression of harmonics prespecified in the standards for the different transmitting frequencies may no longer be fulfilled.

Figure 4:
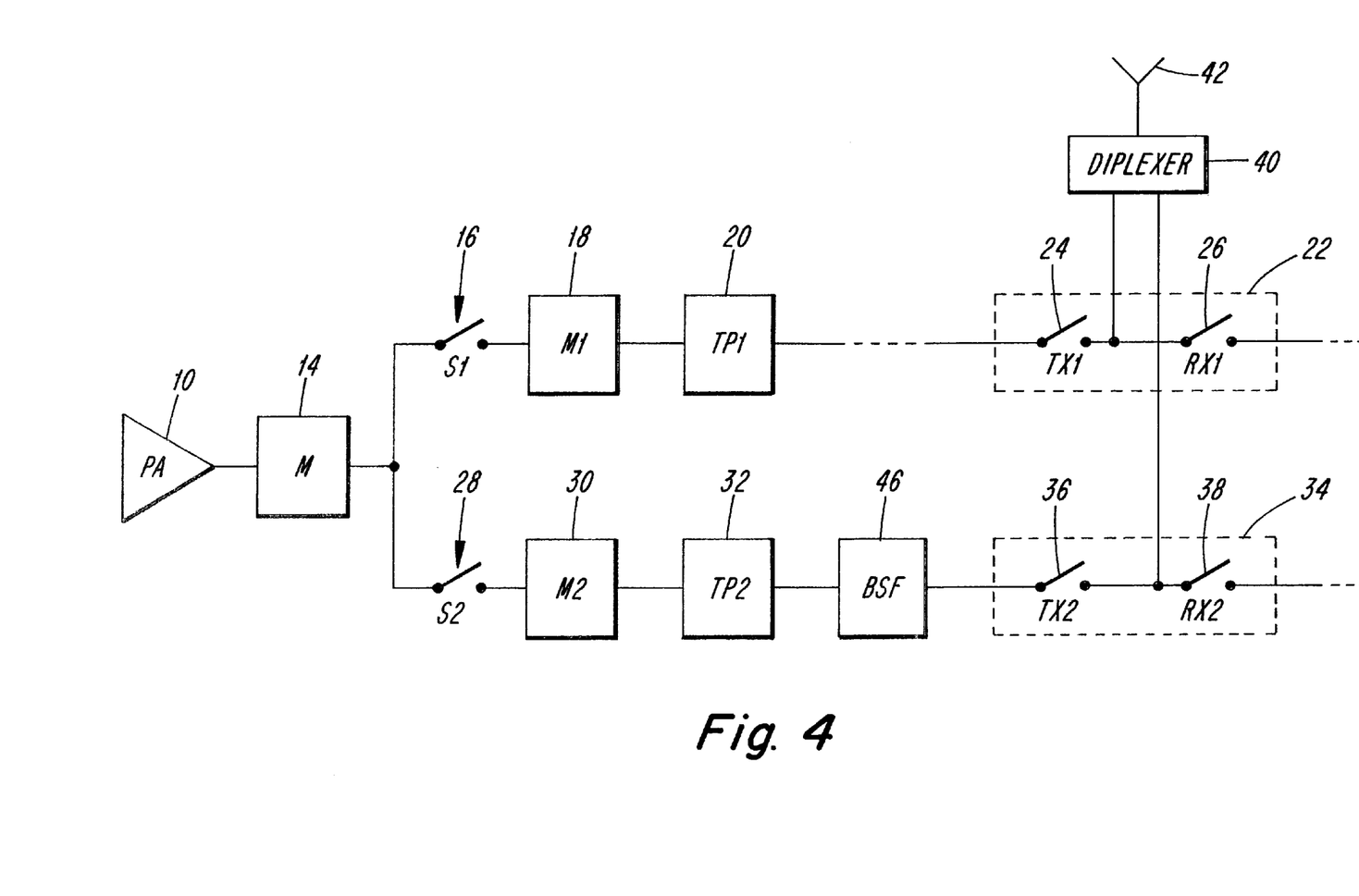
FIG. 4 shows a basic structure of the power amplifier output circuit according to the present invention.

FIG. 4 shows the solution concept for a power amplifier output circuit in accordance with the present invention considering the different cases described with reference to FIG. 3. Here, circuit components having the same functionality as circuit components shown in FIG. 1 are denoted using the same reference numerals.

According to the present invetion in the first operation mode there is inserted a band stop filter 46 in the second transmission branch which is tuned to the harmonics of the first transmitting frequency f1. Hereby the functionality of the power amplifier output circuit described with reference to FIG. 1 is purposefully extended such that in the first operation mode there is achieved a damping of the first harmonic according to the transmitting frequency f1 in the second transmission branch which is complete from a practical point of view.

As is shown in the following, according to the present invention the band stop filter is not realized as dedicated stand alone circuit section but circuit components which are already available such as the second switch 28 and the second transmitter switch 36 are incorporated into the realization of the band stop characteristic. This leads to a multifunctionality of the used circuit components and to an interleaved implementation of different circuit sections while minimizing the necessary circuit complexity and fabrication costs.

Figure 5:
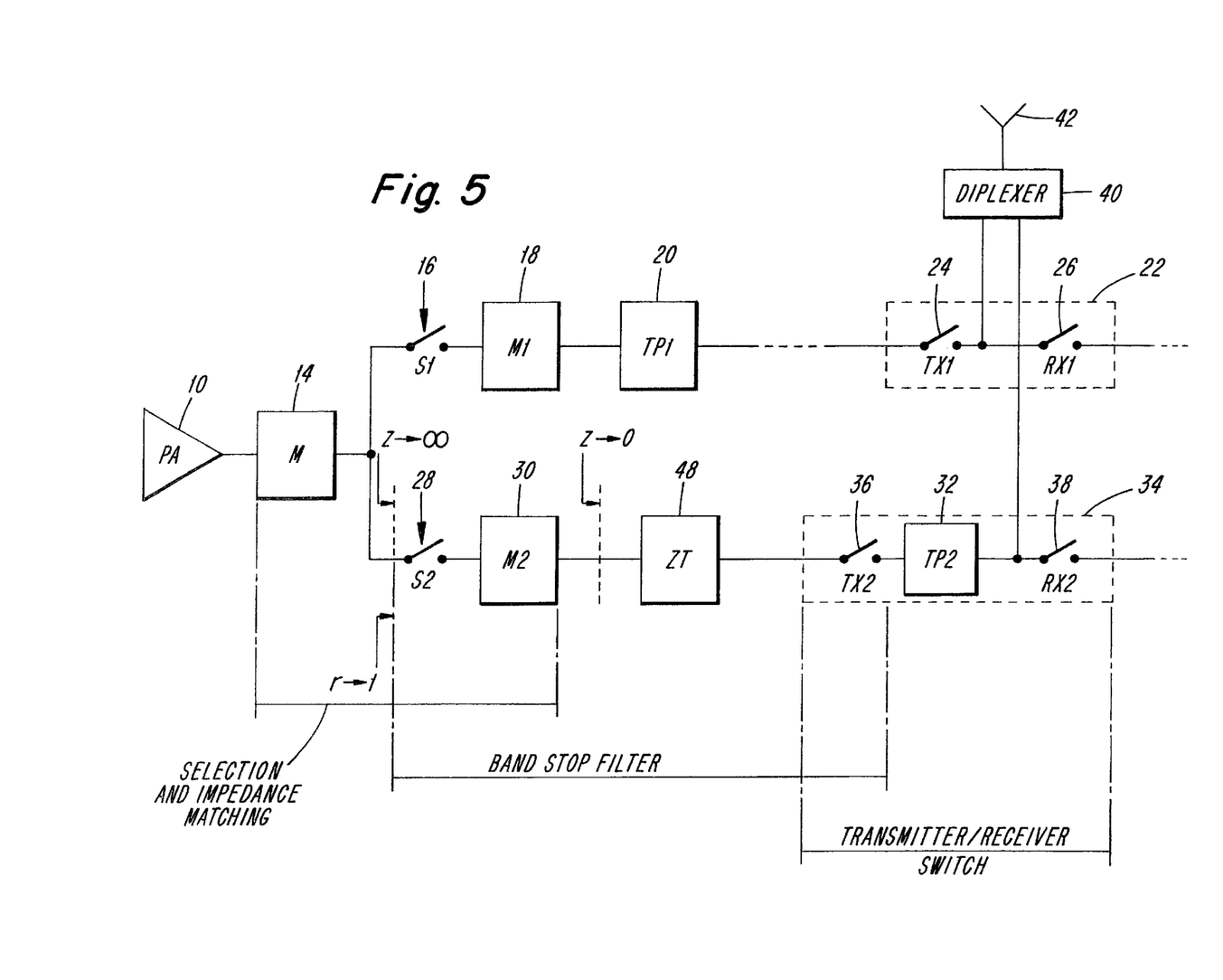
FIG. 5 shows a schematic diagram of the power amplifier output circuit with impedance transformation according to the present invention.

FIG. 5 shows the implementation of this inventive concept with a schematic diagram of the power amplifier output circuit according to the present invention. Here, again circuit components which have he same functionality as the circuit components shown in FIG. 1 are denoted using the same reference numerals.

Contrary to the circuit structure shown in FIG. 1 there is provided an impedance transformation unit 48 upstream the second transmitter/receiver change over unit 34 being adapted to transform the turn off impedance of the second transmitter/receiver change over unit 34 into a short circuit impedance for the first harmonic 2*f1.

For the operation of the power amplifier output circuit shown in FIG. 5 it is of importance that in the first operation mode first harmonics of the first transmitting frequency f1 eventually not suppressed through the second low pass filter 32 see a short circuit at 2*f1 due to the impedance transformation. Further, the opened second switch 28 leads to an opened circuit. The impedance transition established this way in particular for the first harmonic 2*1 of the first transmitting frequency enables the necessary reflection for this harmonic 2*f1 at the input of the second transmission branch.

As shown in FIG. 5, the functional units frequency band selection and impedance matching, switchable band stop filter for harmonics and transmitter/receiver change over unit are provided in an interleaved manner such that specific circuit components have a double functionality. This holds true irrespective of the fact whether the second low pass filter 32 is provided immediately after the second transmitter switch 36 or in the circuit branch lying between the center tap between the second transmitter switch 36 and the second receiver switch 38 and the diplexer 40.

Figure 6:
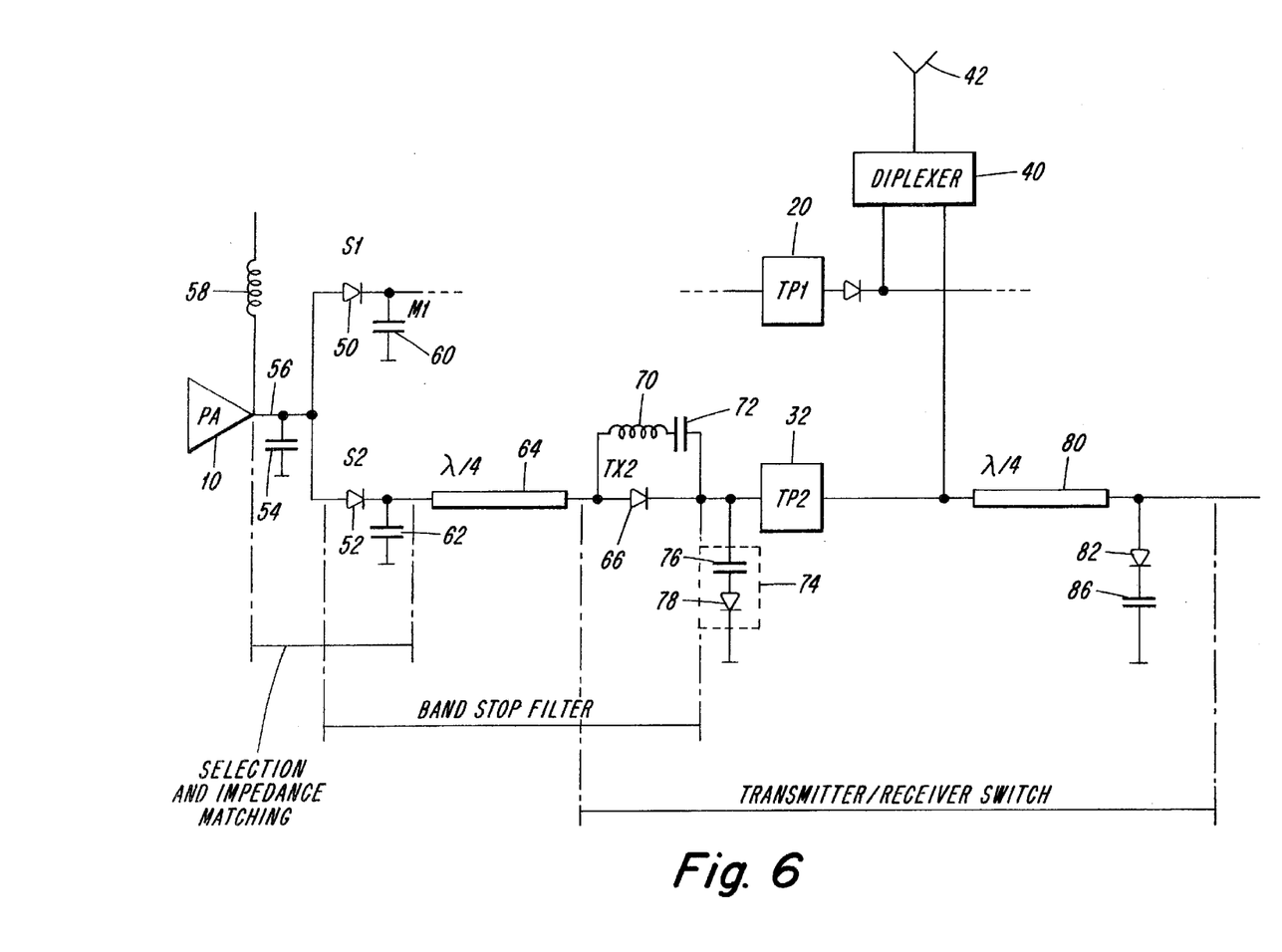
FIG. 6 shows a circuit diagram for a realization of the power amplifier output circuit according to the present invention.

FIG. 6 shows a circuit implementation of the schematic diagram of the power amplifier output circuit according to the present invention shown in FIG. 5. The first switch 16 is realized as a first diode of the PIN type 50, and the second switch 28 is realized as a second diode of the PIN type 52. A first impedance matching circuit is constituted through a first capacitor 54 being connected between ground and a line 56 connecting the output of the power amplifier 10 to the first diode of the PIN type 50 and the second diode of the PIN type 52, respectively. The drain power supply of the power amplifier 10 is achieved via a first inductivity 58 being provided to block signals in the high frequency range.

Further, the second impedance matching circuit 18 is realized through a second capacitor 60 connected between the cathode of the first diode of the PIN type 50 and ground. Still further, the third impedance matching circuit is realized with a third capacitor 62 connected between the cathode of the second diode of the PIN type 52 and ground.

As is also shown in FIG. 6 there is provided a λ/4 line 64 as impedance transformation unit 48 which is tuned to the first harmonic 2*f1 of the first transmitting frequency. Generally there may also be provided a (λ/4+n*λ/2, n=1, 2, ...) line. Alternatively, the impedance transformation may also be achieved through a circuit (not shown) realized with discrete circuit components.

As also shown in FIG. 6, the second transmitter switch 36 is realized with a third diode of the PIN type 66. Across this third diode of the PIN type 66 there is connected a series configuration comprising a second inductivity 70 and a fourth capacity 72.

Operatively, the turn off impedance of the third diode of the PIN type 66 is transformed into a short circuit for the first harmonic 2*f1 of a first transmitting frequency through a λ/4 line 64 tuned to this frequency in the first operation mode whereby the necessary decoupling of the operation modes is achieved The second diode of the PIN type 52, the third diode of the PIN type 66 and the first λ/4 line 64 constitute the band stop filter for the first harmonic 2*f1 of the first transmitting frequency necessary to fulfil the predefined specifications.

Further, in bridging the third diode 66 with the second inductivity 70 there is in addition provided a parallel resonance circuit increasing the turn off impedance of the second transmitter switch 36. This improves the band stop characteristics achieved through the λ/4 line 64. Here, the fourth capacitor 72 is provided to decouple DC components.

For the operation of the power amplifier output circuit according to the present invention it is further of importance that in a second operation mode the second diode of the PIN type 52 and the third diode of the PIN type 66 are connected in series. Due to this series configuration a biasing of these diodes of the PIN type 52 and 66, respectively, is only necessary during transmission via the second transmission branch. This may be achieved very easily as the same biasing current is flowing through both diodes of the PIN type 52 and 66, respectively, and thus this biasing current must be controlled with only a single switching transistor (not shown).

Further, to provide this biasing current only a single power supply (not shown) is necessary that according to the present invention may also be used for the drain power supply of the power amplifier 10.

As also shown in FIG. 6, according to a further preferred embodiment of the present invention there is provided a switchable notch filter 74 downstream the third diode of the PIN type 66 The second low pass filter 32 is provided between the switchable notch filter 74 and the diplexer 40 in series configuration. The switchable notch filter 74 comprises a fifth capacitor 76 connected to ground via a fourth diode of the PIN type 78.

This enables a further improved damping of the first harmonic 2*f1 in the firs operation mode. The fourth capacitor 76 of the switchable notch filter 74 together with the parasitic inactivity of the fourth diode of the PIN type 78 constitutes a series resonance circuit tuned to the first harmonic 2*f1 of the first transmitting frequency. Hereby the filter characteristics in the first operation mode is further improved in the second transmission branch.

FIG. 6 also shows a preferred realization of the second receiving switch 38. A second λ/4 line 80 lies in the signal path for the reception in the second operation mode. Generally, also a (λ/4+n*λ/2, n=1, 2, ... ) line may be used. At the end of the second λ/4 line 80 leading away from the antenna 42 there branches off a series circuit to ground comprising a fifth diode of the PIN type 82 and a sixth capacitor 86.

While the sixth capacitor is provided to decouple DC components the turn on and turn off impedance of the fifth diode of the PIN type 82 is transformed through the second λ/4 line 80 either into an opened circuit or short circuit impedance lying in the signal path for the reception in the second operation mode. This circuit construction facilitates the integration of the power amplifier output circuit according to the present invention and may also be easily applied to the first reception switch 26.

Figure 7:
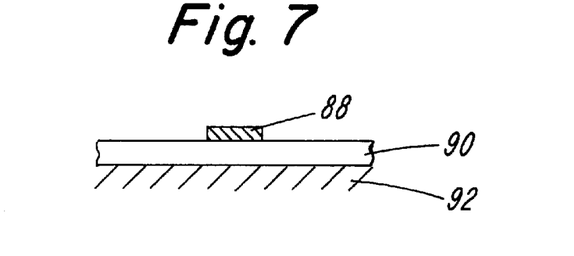
FIG. 7 shows a realization of the impedance transformation unit according to the present invention in the form of a $\lambda/4$ line in microstrip technology.

FIG. 7 shows one possible realization of the λ/4 lines 64 and 80, respectively, in microstrip technology. Here a microstrip line 88 is provided as λ/4 line on a dielectric 90. The dielectric 90 is provided on a metallized ground surface 92 of a substrate layer.

Figure 8:
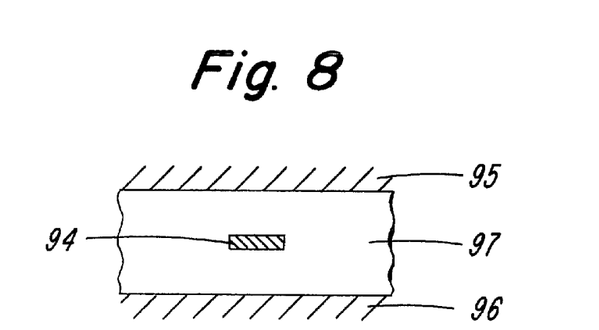
FIG. 8 shows the realization of the impedance transformation unit according to the present invention as $\lambda/4$ line in stripline technology.

FIG. 8 shows a further realization of the λ/4 lines 64 and 80 in strip line technology. With this realization a stripline element 94 is provided between an upper substrate layer metallization 95 and a lower substrate layer metallization 96 and is isolated towards the upper and lower substrate layer metallization 96 and is isolated towards the upper and lower substrate layer metallization 95 and 96, respectively, via a dielectric 97.

Figure 9:
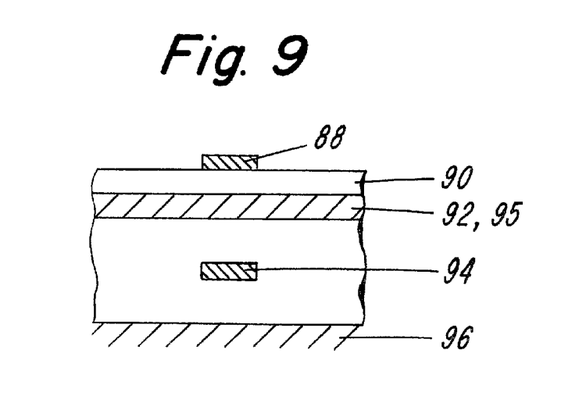
FIG. 9 shows the realization of the impedance transformation unit according to the present invention as $\lambda/4$ line in combined microstrip and stripline technology, respectively.

As shown in FIG. 9, the realization of the λ/4 lines 64 and 80 according to FIGS. 7 and 8 may advantageously be combined such that existing and approved layouts for power amplifier output circuits may be maintained with minimized modifications. In particular, the λ/4 line 64 to transform the turn-off impedance of the second transmitter switch may be realized in a multilayer fashion such that existing placement positions for the other circuit components must not be amended.

While the present invention has been described with respect to dual band mobile phones it may easily be appreciated that it may be used in any mobile communication unit wherein a radio transmission in a plurality of frequency bands is used. Further, the features according to the present invention being described with respect to different embodiment may be freely combined with each other without any restrictions.

What is claimed is:

1. Power amplifier output circuit for a dual band mobile radio unit, comprising:
    a) a first transmitter/receiver change over unit (24, 26) to transmit/receive a first transmitting/receiving signal in a first frequency band via an antenna (42) of the mobile radio unit,
    b) a second transmitter/receiver change over unit (36, 38) to transmit/receive a second transmitting/receiving signal in a second frequency band above the first frequency band via the antenna (42) of the mobile radio unit, wherein
    c) a change over unit (16, 28) having a first switching unit (16) and a second switching unit (28) and selectively connecting a power amplifier (10) to amplify the transmitting signals with the first and second transmitter/receiver change over unit, respectively, and
    d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band.

2. Power amplifier output circuit according to claim 1, wherein the impedance transformation unit (48) is provided as first (λ/4+n*λ/2, n=0, 1, . . . ) line (64) being tuned to the double center frequency (2*f1) of the first frequency band.

3. Power amplifier output circuit according to claim 1, wherein the impedance transformation unit (48) is implemented with discrete circuit components such that at the input thereof the impedance for this double center frequency (2*f1) of the first frequency band is a short circuit.

4. Power amplifier output circuit according to claim 1, wherein the second transmitter/receiver change over unit (36, 38) comprises a third switching unit (38) activated in the transmitting mode and a fourth switching unit activated in the receiving mode.

5. Power amplifier output circuit according to claim 1, wherein there is provided a first impedance matching circuit (14) between the power amplifier (10) and the change over unit (16, 28).

6. Power amplifier output circuit according to claim 1, wherein a second impedance matching circuit (18) is provided between the first switching unit (16) and the first transmitter/receiver change over unit (24, 26).

7. Power amplifier output circuit according to claim 1, wherein a third impedance matching circuit (30) is provided between the second switching unit (28) and the second transmitter/receiver change over unit (36, 38).

8. Power amplifier output circuit for a dual band mobile radio unit, comprising:
    a) a first transmitter/receiver change over unit (24, 26) to transmit/receive a first transmitting/receiving signal in a first frequency band via an antenna (42) of the mobile radio unit,
    b) a second transmitter/receiver change over unit (36, 38) to transmit/receive a second transmitting/receiving signal in a second frequency band above the first frequency band via the antenna (42) of the mobile radio unit, wherein
    c) a change over unit (16, 28) having a first switching unit (16) and a second switching unit (28) and selectively connecting a power amplifier (10) to amplify the transmitting signals with the first and second transmitter/receiver change over unit, respectively,
    d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band, and
    e) the change over unit (16, 28) is provided with a first change over unit (16) connected between the output of the power amplifier (10) and the first transmitter/receiver change over unit (24, 26) and a second change over unit (28) connected between the output of the power amplifier (10) and the second transmitter/receiver change over unit (36, 38).

9. Power amplifier output circuit according to claim 8, wherein the impedance transformation unit (48) is provided as first (λ/4+n*λ/2, n=0, 1, . . . ) line (64) being tuned to the double center frequency (2*f1) of the first frequency band.

10. Power amplifier output circuit according to claim 8, wherein the impedance transformation unit (48) is implemented with discrete circuit components such that at the input thereof the impedance for this double center frequency (2*f1) of the first frequency band is a short circuit.

11. Power amplifier output circuit according to claim 8, wherein the second transmitter/receiver change over unit (36, 38) comprises a third switching unit (38) activated in the transmitting mode and a fourth switching unit activated in the receiving mode.

12. Power amplifier output circuit according to claim 8, wherein there is provided a first impedance matching circuit (14) between the power amplifier (10) and the change over unit (16, 28).

13. Power amplifier output circuit according to claim 8, wherein a second impedance matching circuit (18) is provided between the first switching unit (16) and the first transmitter/receiver change over unit (24, 26).

14. Power amplifier output circuit according to claim 8, therein a third impedance matching circuit (30) is provided between the second switching unit (28) and the second transmitter/receiver change over unit (36, 38).

15. Power amplifier output circuit according to claim 11, wherein the first switching unit (16), the second switching unit (28), and/or the third switching unit (36), respectively, are provided as first diode of the PIN type (50), second diode of the PIN type (52), and/or third diode of the PIN type (66), respectively.

16. Power amplifier output circuit according to claim 14, wherein the third switching unit (36) is bridged with a series circuit comprising an inductivity (70) and a capacitor (72).

17. Power amplifier output circuit for a dual band mobile radio unit, comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmit/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band,
   e) the second transmitter/receiver change over unit (36, 38) comprises a third switching unit (38) activated in the transmitting mode and a fourth switching unit activated in the receiving mode, and
   f) there is provided a switchable notch filter (74) between the third switching unit (36) and the antenna (42) of the mobile radio unit.

18. Power amplifier output circuit according to claim 11, wherein the switchable notch filter (74) comprises a capacitor (76) connected to ground via a fourth diode of the PIN type (78).

19. Power amplifier output circuit for a dual band mobile radio unit, comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmit/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band, and
   e) upstream the antenna (42) of the mobile radio unit there is provided a low pass filter (32) the cutoff frequency of which is determined through a second frequency band.

20. Power amplifier output circuit for a dual band mobile radio unit; comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmit/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band, and
   e) there is provided a first impedance matching circuit (14) between the power amplifier (10) and the change over unit (16, 28), and further
   f) a second impedance matching circuit (18) between the first switching unit (16) and the first transmitter/receiver change over unit (24, 26), and a third impedance matching circuit (30) is provided between the second switching unit (28) and the second transmitter/receiver change over unit (36, 38), such that
   g) each of the first impedance matching circuit (14), the second impedance matching circuit (18) and/or the third impedance matching circuit (30) is provided as line/coil in series configuration and capacitor (54, 60, 62) branching off to ground.

21. Power amplifier output circuit for a dual band mobile radio unit, comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmitter/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band,
   e) the second transmitter/receiver change over unit (36, 38) comprises a third switching unit (38) activated in the transmitting mode and a fourth switching unit activated in the receiving mode, and
   f) as fourth switching unit (38) there is provided a second ($\lambda/4+n*\lambda/2$, n=0, 1, . . . ) line (80) lying in the line to carry the second receiving signal such that at the end leading away from the antenna a fifth diode of the PIN type (82) branches off to ground.

22. Power amplifier output circuit according to claim 21, wherein the second ($\lambda/4+n*\lambda/2$, n=0, 1, . . . ) line (80) is realized with at least one microstrip section and/or at least one strip line section in at least one circuit substrate layer.

23. Power amplifier output circuit for a dual band mobile radio unit, comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmit/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tuned to harmonics of the center frequency (f1) of the first frequency band,
   e) the impedance transformation unit (48) is provided as first ($\lambda/4+n*\lambda/2$, n=0, 1, . . . ) line (64) being tuned to the double center frequency (2*f1) of the first frequency band, such that the first ($\lambda/4+n*\lambda/2$, n=0, 1, . . . ) line (64) is realized with at least one microstrip section and/or at least one strip section in at least one circuit substrate layer.

24. Power amplifier output circuit for a dual band mobile radio unit, comprising:
   a) a first transmitter/receiver change over unit (24, 26) to transmit/receive a first transmitting/receiving signal in a first frequency band via an antenna (42) of the mobile radio unit,
   b) a second transmitter/receiver change over unit (36, 38) to transmit/receive a second transmitting/receiving signal in a second frequency band above the first frequency band via the antenna (42) of the mobile radio unit, wherein
   c) a change over unit (16, 28) having a first switching unit (16) and a second switching unit (28) and selectively connecting a power amplifier (10) to amplify the transmitting signals with the first and second transmitter/receiver change over unit, respectively,
   d) an impedance transformation unit (48) is provided to transform a turn off impedance of the second transmitter/receiver change over unit (36, 38) during the transmission of the first transmitting signal to a band stop characteristic tune to harmonics of the center frequency (f1) of the first frequency band, and
   e) the first transmitter/receiver change over unit (22) is provided with a fifth switching unit (26) activated in the receiving mode.

25. Power amplifier output circuit according to claim 24, wherein there is provided a diplexer (40) to couple the antenna to the power amplifier output circuit such that its input terminals are connected to a first center tap between the third switching unit (36) and the fourth switching unit (38) and a second center tap between the fifth switching unit (24) and the sixth switching unit (26).

26. Method to operate a power amplifier output circuit for a dual band mobile radio unit, comprising the steps:
   a) transmitting/receiving a first transmitting/receiving signal in a first frequency band via an antenna of the mobile radio unit and a first transmitter/receiver change over unit (24, 26),
   b) transmitting/receiving a second transmitting/receiving signal in a second frequency band above the first frequency band via the antenna of the mobile radio unit and a second transmitter/receiver change over unit (24, 26; 36, 38), respectively, and
   c) selectively connecting an output of a power amplifier (10) for amplifying the transmitting signals with the first and second transmitter/receiver change over unit (24, 26; 36, 38), respectively, and
   d) filtering the first harmonic of the first transmitting signal in the transmission branch for the second transmitting/receiving signal with a band stop when transmitting the first transmitting signal.

27. Method to operate a power amplifier output circuit according to claim 26, wherein harmonics of the first transmitting signals above the center frequency (f2) of the second frequency band are filtered in the transmission branch of the second transmission/receiving signal with a low pass filter (32) when sending the first transmitting signal.

28. Method to operate a power amplifier output circuit according to claim 26, wherein a band stop is realized in the second transmission branch through transforming the turn-off impedance of the second transmitter/receiver change over unit (36, 38) into an open circuit impedance for the first harmonic of the center frequency f1 of the first frequency band.

29. Method to operate a power amplifier output circuit according to claim 27, wherein a band stop is realized in the second transmission branch through transforming the turn-off impedance of the second transmitter/receiver change over unit (36, 38) into an open circuit impedance for the first harmonic of the center frequency f1 of the first frequency band.

30. Method to operate a power amplifier circuit according to claim 26, wherein the first harmonic of the first transmitting signal is additionally filtered in the transmission branch (42) transmitting/receiving signal with a switchable notch filter (74) when sending the first transmitting signal.

31. Method to operate a power amplifier circuit according to claim 27, wherein the first harmonic of the first transmitting signal is additionally filtered in the transmission branch (42) transmitting/receiving signal with a switchable notch filter (74) when sending the first transmitting signal.

32. Method to operate a power amplifier circuit according to claim 28, wherein the first harmonic of the first transmitting signal is additionally filtered in the transmission branch (42) transmitting/receiving signal with a switchable notch filter (74) when sending the first transmitting signal.

* * * * *